United States Patent [19]

Ranke

[11] Patent Number: 4,780,115

[45] Date of Patent: Oct. 25, 1988

[54] PROCESS FOR REMOVING UNDESIRABLE COMPONENTS FROM GASES

[75] Inventor: Gerhard Ranke, Poecking, Fed. Rep. of Germany

[73] Assignee: Linde Aktiengesellschaft, Wiesbaden, Fed. Rep. of Germany

[21] Appl. No.: 39,874

[22] Filed: Apr. 20, 1987

[30] Foreign Application Priority Data

Apr. 18, 1986 [DE] Fed. Rep. of Germany ....... 3613110

[51] Int. Cl.$^4$ .............................................. B01D 47/00
[52] U.S. Cl. ......................................... 55/43; 55/44; 55/48; 55/68; 55/73; 62/17
[58] Field of Search ................... 55/68, 73, 43, 48, 46, 55/44; 62/17

[56] References Cited

U.S. PATENT DOCUMENTS 3,899,312 8/1975 Kruis ....................................... 55/73
4,324,567 4/1982 Ranke et al. ............................ 55/43

FOREIGN PATENT DOCUMENTS 0053424 6/1982 European Pat. Off. ................. 55/43
119610 5/1976 German Democratic Rep. .
147622 4/1981 German Democratic Rep. .... 55/73
286622 6/1929 United Kingdom .................... 55/73

OTHER PUBLICATIONS

Ullmanns Encyklopaedie der technischen Chemie, 4th Edition, vol. 3, pp. 107–110 and p. 172.

Primary Examiner—Bernard Novick
Attorney, Agent, or Firm—Millen & White

[57] ABSTRACT

In a process for the regeneration of a scrubbing medium which has been utilized in a scrubbing operation and therein loaded with scrubbed-out components, the scrubbing medium is expanded and regenerated and hence can be reused in the scrubbing operation. In order to be able to subject expansion gases obtained during the expansion to an after-treatment under elevated pressure, or to be able to discharge these expansion gases under a higher pressure, the loaded scrubbing medium is expanded in at least two stages. Expansion in one stage is performed by means of a liquid-jet compressor and the expansion gases of a subsequent expansion stage are brought to an elevated pressure by means of the liquid-jet compressor.

19 Claims, 4 Drawing Sheets

PROCESS FOR REMOVING UNDESIRABLE COMPONENTS FROM GASES

BACKGROUND OF THE INVENTION

This invention relates to a process for the regeneration of a scrubbing medium which has been utilized in a pressurized scrubbing operation and therein loaded with scrubbed-out components, this scrubbing medium being expanded, regenerated, and then reused in the scrubbing operation.

In scrubbing operations, throttle valves are usually employed for expanding the loaded scrubbing medium from the scrubbing column to a lower pressure. Expansion turbines are utilized only in cases where large liquid quantities are involved for purposes of energy recovery. The use of expansion turbines, in spite of energy recovery, has several drawbacks.

The cost of turbines is very high so that they are economical only if the amount of recoverable energy is potentially large.

If the loaded scrubbing medium is extensively degasified, difficulties are encountered in the turbine due to an unfavorable liquid/gas volume ratio. On account of the fact that expansion turbines are prone to trouble, it is necessary either to insert a second unit in parallel as a standby or to install a throttle valve.

If an expansion turbine is coupled with the scrubbing medium pump, a motor must also be connected to the pump to provide make-up pump energy as required, and in order to provide the entire pump energy in case of failure of the turbine or during startup of the plant.

Based on the aforementioned disadvantages, it is customary, for example in acid gas scrubbing operations, to utilize expansion turbines only in large installations (i.e., in case of liquid quantities of several 100 m³/h) and with relatively large pressure drops. On the other hand, there is interest in providing for gas compression in many scrubbing operations—especially in physical scrubbing processes for acid gas removal—wherein the liquid quantities or pressure drops do not justify the employment of an expensive turbine. For example, gas compression becomes of interest when expansion gases are to be recycled into the crude gas or utilized as a product for further treatment or when the scrubbing medium is to be subjected to a vacuum in order to lower the gas load in the expanded scrubbing medium.

Customarily, compressors are utilized for such compression needs. Besides the energy consumed for compression, an additional disadvantage associated with the employment of compressors is that the gas is heated in the compressor. For this reason, in most cases a recooler is also required for recooling the compressed gas. If the compressed gas is to be further treated in the scrubbing operation, which is very often the case, especially with H₂S-containing gases, refrigeration losses are imposed by this compression, and these losses must be covered by external refrigeration.

Therefore, East German Pat. No. 119,610 teaches one to effect compression of expansion gases, obtained under vacuum, by means of a jet comressor, also called a jet ejector. In this process, gases obtained during an intermediate expansion, which have a higher pressure than the gases to be compressed, are utilized as the propulsion media for the jet compressor.

The essential advantage of this process resides in that no external energy is needed for compression, and, at the same time, there is no heating for the exhausted expansion gases. However, the method can only be employed if a relatively large amount of expansion gas, at a higher pressure, is already available and, at the same time, if all gases can be discharged without being under pressure. A further drawback involved is the additional installation of expansion tanks which serve for obtaining propulsion gases for the jet compressors.

SUMMARY OF THE INVENTION

An object of one aspect of the present invention is to provide a process wherein expansion gases obtained in an expansion step can be further treated under elevated pressure or can be discharged at a higher pressure.

Upon further study of the specification and appended claims, further objects and advantages of this invention will become apparent to those skilled in the art.

These objectives have been attained according to this invention by expanding the loaded scrubbing medium in at least two stages, performing the expansion in one stage by means of a liquid-jet ejector or liquid-jet compressor, and then bringing the expansion gases from a subsequent expansion stage to an elevated pressure by means of the liquid-jet compressor.

It has been found in the context of this invention that, besides gas, it is also possible to use the loaded scrubbing medium as a liquid propulsion medium in a liquid-jet compressor whereby a substantially larger amount of gas can be compressed than, for example, in the process according to East German Pat. No. 119,610 which employs a gaseous propulsion medium.

Since the loaded scrubbing medium is used as the propulsion medium rather than expansion gases, the liquid-jet compressor herein operates even if, during pressure lowering, no gas or only very little gas is released, and thus can operate in cases where the method known from the East German patent cannot be utilized.

In some instances, especially in cases where concomitantly dissolved inert gases are to be obtained under maximally high pressure, it is advantageous to expand the loaded scrubbing medium in a two-stage procedure so that the gases can be recycled to the pressure scrubbing step with a minimum expenditure of energy. The concomitantly dissolved inert gases are released during the first expansion and then the scrubbing medium is further expanded in a second expansion wherein it is employed as a propulsion medium for a liquid-jet compressor. Thus, initially the loaded scrubbing medium is expanded to an intermediate pressure, for example in an expansion turbine, and the liberated gaseous phase is recycled to a point upstream of the pressure scrubbing stage. The partially expanded scrubbing medium is then fed to a liquid-jet compressor for further expansion. It is clear that also in this case of a two-stage pressure lowering operation, the compression energy produced by such a pressure lowering operation can be utilized for raising the pressure of expansion gases obtained in subsequent process steps.

According to another advantageous embodiment for the process according to this invention, the loaded scrubbing medium can be expanded stepwise by means of several series-connected liquid-jet compressors. At the same time, the gases released in a subsequent expansion stage can herein be compressed in a preceding expansion stage. The advantage of this mode of operation resides in that the pressure of the expansion gases can be raised to a greater extent. It thus becomes possible to adapt the method of this invention to the respective process conditions.

The process of this invention can be utilized in a wide variety of systems which need gas compression based on a very diversified requirements.

One utilization of gas compression can be to lower the partial pressure of acid gases in the cold-regenerated scrubbing medium of a sour gas scrubbing operation without the use of stripping gas or vacuum compressor means.

In water scrubbing operations for the removal of $CO_2$ from gases, it is possible, for example, to reduce the load in loaded scrubbing water by lowering its pressure and thereby lower the load of the regenerated water. Since the regenerated scrubbing medium recycled to the scrubbing operation has a lower load, the result is a lower residual $CO_2$ content in the scrubbed product due to greater absorption. This is accomplished without the use of stripping gas or vacuum, i.e., without a compressor, while at the same time improving the yield of removed $CO_2$.

A further utilization of gas compression can be to increase the $CO_2$ yield in physical scrubbing operations before a subsequent stripping operation. Gas compression can also be suitable for obtaining additional peak cold in physical scrubbing processes.

Finally, it is possible by gas compression to reduce the $CO_2$ load in chemical scrubbing operations prior to thermal regeneration, or to reduce the $CO_2$ load of the scrubbing medium that is regenerated solely by expansion. Thereby, the quantity of scrubbing medium circulated can be reduced on account of greater $CO_2$ absorption. Also, the energy requirement of a subsequent fine scrubbing step can be reduced since, with the more highly regenerated scrubbing medium, the $CO_2$ can be scrubbed out more advantageously from the crude gas in the rough or initial scrubbing stage.

BRIEF DESCRIPTION OF THE DRAWINGS

Various other objects, features and attendant advantages of the present invention will be more fully appreciated as the same becomes better understood when considered in conjunction with the schematically illustrated flowsheets in the accompanying drawings, in which like reference characters designate the same or similar parts, and wherein.

DETAILED DESCRIPTION OF THE DRAWINGS

Figure 1:
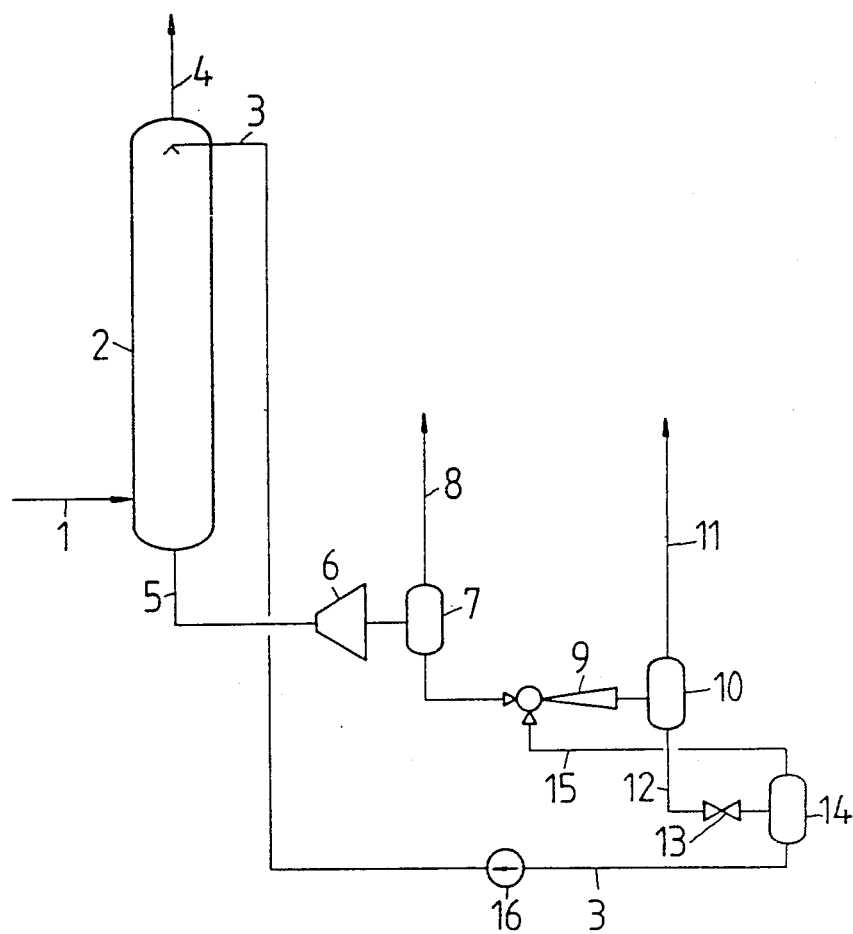
FIG. 1 shows removal of $CO_2$ from a gas stream by a water scrubbing operation.

According to FIG. 1, a scrubbing column 2 is charged via conduit 1 with 10,000 $Nm^3/h$ of crude gas under a pressure of 40 bar and at a temperature of 30° C. The crude gas has the following composition:

| $H_2$ | 65 vol-% |
|---|---|
| $N_2$ + CO | 5 vol-% |

-continued

| $CO_2$ | 30 vol-% |
|---|---|

Via conduit 3, the scrubbing column 2 is charged with 500 t/h of scrubbing water which absorbs $CO_2$ from countercurrently rising crude gas. Via conduit 4, pure product gas at a temperature of about 30.5°–31° C. can thus be withdrawn containing at this point merely maximally about 1 vol-% of $CO_2$.

Via conduit 5, the $CO_2$-loaded water is discharged at a temperature which is almost identical with the temperature of the pure product gas, because of the large amount of water the increase of temperature is very small. In order to obtain a residual $CO_2$ content of below about 1 vol-% in the product gas, the loaded water is first expanded to 10 bar in an expansion turbine 6. After separating the thus-released gaseous phase via conduit 8, namely 926 $Nm^3/h$, consisting of:

| $CO_2$ | 76 vol-% |
|---|---|
| $H_2$ + CO | 24 vol-% | in a separator 7, the water is expanded to a pressure of 1.2 bar by way of a liquid-jet compressor 9. The thereby released gaseous phase (2,063 $Nm^3/h$, containing 95.4 vol-% of $CO_2$, remainder being $H_2$+CO) is withdrawn from a further phase separator 10 via conduit 11 under a pressure of 1.2 bar. By way of conduit 12, the water is withdrawn from phase separator 10 and further expanded to 0.3 bar in a conventional throttle valve 13. In a downstream phase separator 14, the thus-obtained expansion gas (321 $Nm^3/h$ of $CO_2$+$H_2$) is discharged via conduit 15 and raised to a pressure of 1.2 bar in the liquid-jet compressor 9. The regenerated water is withdrawn from phase separator 14 via conduit 3 with pump 16 and reintroduced into the scrubbing column 2.

Figure 4:
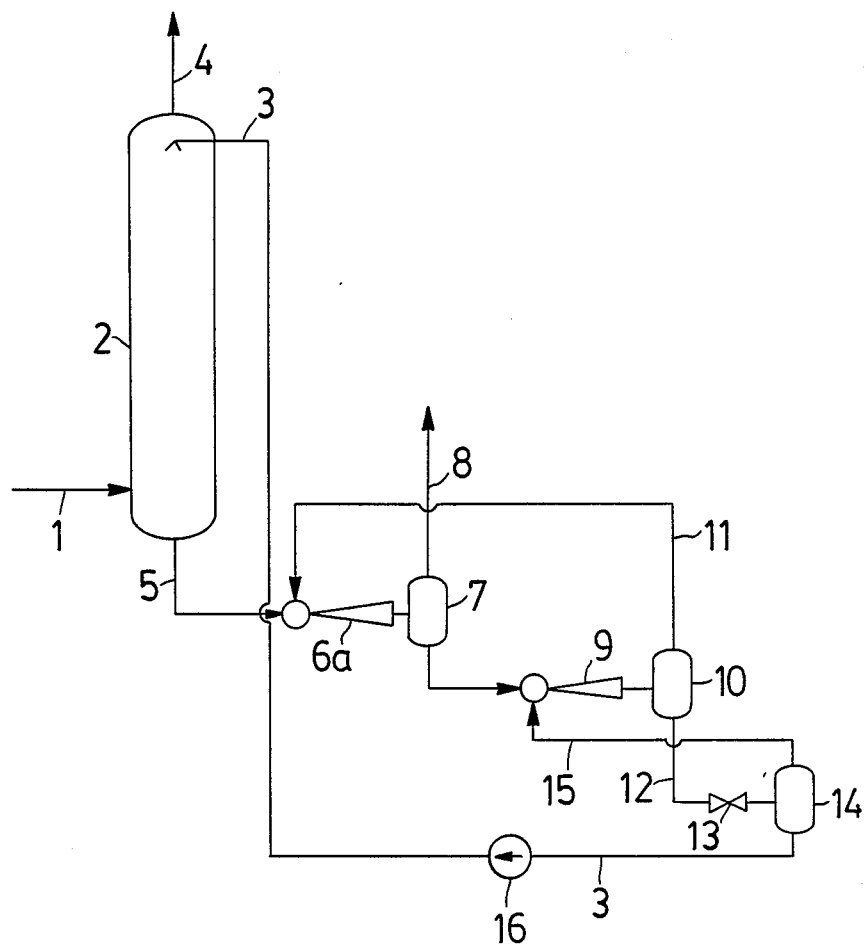
FIG. 4 illustrates step-wise expansion of a loaded scrubbing medium using several liquid-jet compressors in series.

In the conventional processes, the amount of gas withdrawn from separator 14 is compressed in conduit 15 by means of a vacuum compressor. The energy expenditure required therefor amounts to about 22 kW. The primary advantages of the process of this invention as compared with the process customary heretofore resides not only in a saving of energy but more importantly it permits the elimination of the vacuum compressor, i.e., a piston compressor with movable parts, representing a wear-prone part of the installation requiring frequent servicing. The liquid-jet compressor, in contrast thereto, represents a substantially cheaper and a less maintenance intensive solution. FIG. 4 illustrates an embodiment similar to that of FIG. 1 except that the expansion turbine 6 is replaced by a liquid-jet compressor 6a. Loaded scrubbing medium is thus expanded by two liquid-jet compressors, i.e. 6a and 9, connected in series.

Figure 2:
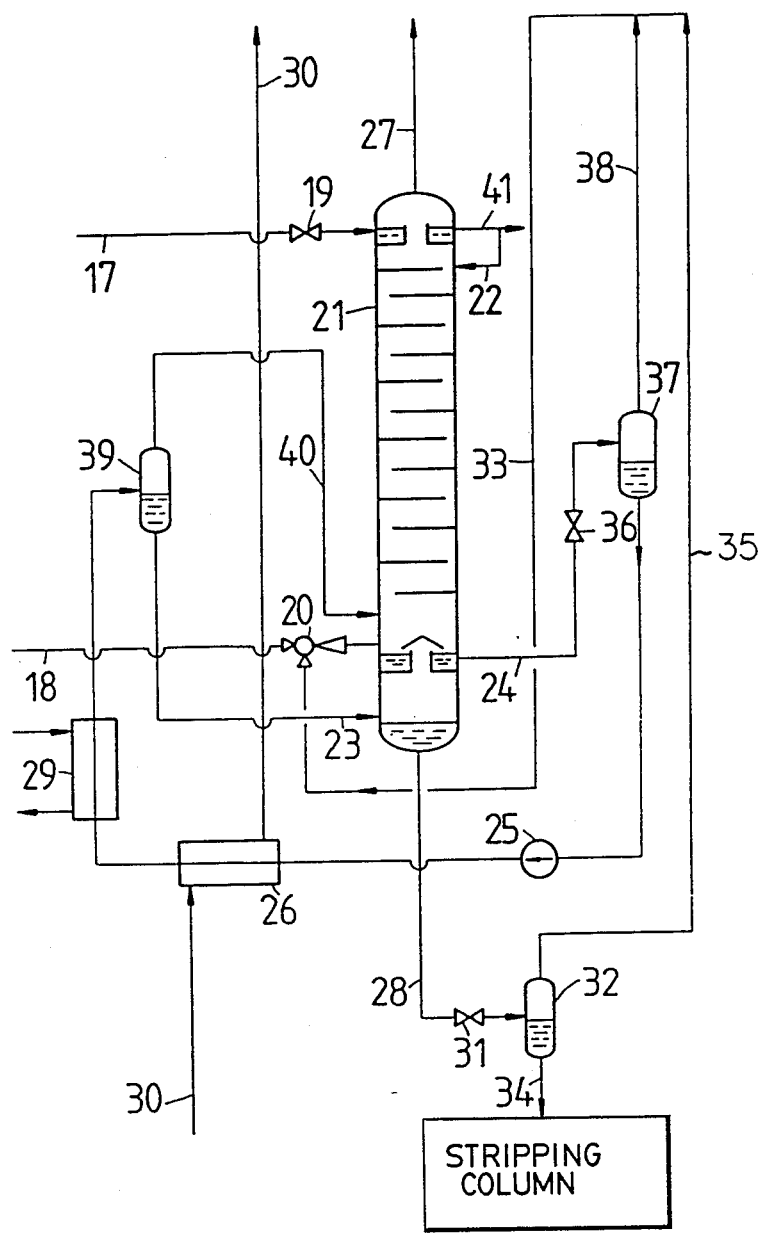
FIG. 2 shows how the process of the invention can be used to increase $CO_2$ yield in a physical scrubbing operation.

FIG. 2 illustrates a section of the regenerating portion of an installation for the separation and obtainment of gaseous components, especially $CO_2$, COS and $H_2S$, from a gaseous mixture by means of a physical scrubbing operation.

By way of conduit 17, 55 t/h of scrubbing methanol, almost saturated with $CO_2$, from a scrubbing column (not shown) is conducted at a temperature of −40° and under a pressure of 25 bar. By way of conduit 18, 45 t/h of scrubbing methanol is introduced which has been loaded in the scrubbing column (not shown) with $CO_2$, $H_2S$ and COS and which is obtained under a pressure of likewise 25 bar and at a temperature of $-7°$ C. The methanol stream in conduit 18, loaded with $CO_2$ and also sulfur compounds, represents the first scrubbing medium stream; the methanol stream in conduit 17, loaded only with $CO_2$, represents the second scrubbing medium stream.

The first scrubbing medium stream is expanded in a liquid-jet compressor 20 to a pressure of 3 bar. The second scrubbing medium stream is expanded in a throttle valve 19 to a pressure of 3 bar. Both scrubbing medium streams are then introduced into an enrichment column 21. The first scrubbing medium stream is introduced into the middle portion and the second stream is introduced into the head portion which is equipped with separator. During expansion, gaseous fractions are liberated in each case. In the case of the second scrubbing medium stream, a fraction of predominantly $CO_2$ is liberated and discharged from the column head via conduit 27, and in the case of the first scrubbing medium stream, a fraction containing $CO_2$ as well as $H_2S$ and COS is liberated which then rises upwardly in the interior of the column. The proportions of $H_2S$ and COS are scrubbed from this gaseous, rising fraction by a portion of the second scrubbing medium stream that is returned from the separator at the column head via a conduit 22 into the upper section of the enrichment column 21. This returned portion of the second scrubbing medium stream amounts to 35 t/h.

The scrubbing medium streams collected above a flue plate in the lower part of the enrichment column 21 are discharged via a conduit 24, brought to an intermediate pressure of 0.7 bar in a throttle valve 36, and then introduced into a separator 37. The gaseous fraction released after intermediate expansion in valve 36, containing $CO_2$ and small proportions of $H_2S$ and COS, is passed on via conduit 38 to a conduit 33 which will be described below. The bottoms liquid from separator 37 is conveyed with the aid of a liquid pump 25 through heat exchangers 26 and 29 and subsequently returned, by way of a conduit 23, into the lowermost section of the enrichment column 21 which functions as a separator. During this step, the scrubbing medium is heated from $-55°$ C. to $-43°$ C. in heat exchanger 26 by heat exchange with methanol, fed via a conduit 30 (the methanol in conduit 30 being completely regenerated in a subsequent part of the installation, not shown); and then heated to $-33°$ C. in heat exchanger 29 by heat exchange with a methanol stream, previously loaded with $CO_2$, which yields heat of absorption. In a separator 39, a gaseous fraction is separated which contains $CO_2$, $H_2S$ and COS and is introduced via a conduit 40 into the enrichment column 21. This gaseous fraction introduced by conduit 40 containing mostly $CO_2$ with minor proportions of $H_2S$ and COS, flows through the enrichment column 21 in the upward direction and during this step is likewise freed of the sulfur-containing components by means of the second scrubbing medium stream. Gases separated in the lowermost section of the enrichment column flow through the flue plate and upwardly through the enrichment column whereby they are also scrubbed by the second scrubbing medium stream.

Via a conduit 27, 23,316 $Nm^3/h$ of a first product gas is withdrawn from the head of the enrichment column 21. This product gas consists of 23,000 $Nm^3/h$ of $CO_2$, 247 $Nm^3/h$ of $H_2$, 49 $Nm^3/h$ of CO, Ar, $CH_4$, and 20 $Nm^3h$ of $N_2$. The purity of the gaseous $CO_2$ product is 98.7 vol-%. The $CO_2$ product is obtained at a temperature of $-49°$ C.

From the bottom of the enrichment column 21, 80 t/h of methanol, now enriched in $H_2S$ and COS, is withdrawn at a temperature of $-33°$ C. This methanol entrains, in dissolved form, 7,232 $Nm^3/h$ of $CO_2$ as well as 1,025 $Nm^3/h$ of $H_2S$ and COS. This enriched methanol is introduced via a conduit 28 into a throttle valve 31, expanded to a pressure of 0.7 bar, and then introduced into a separator 32. The gaseous fraction liberated during this expansion (4,896 $Nm^3/h$ of $CO_2$ and 295 $Nm^3/h$ of $H_2S$ and COS) is removed from separation 32 via conduit 35 and is delivered via conduit 33 to the liquid-jet compressor 20 and, after recompression to the pressure of the enrichment column 21, fed into the latter.

In accordance with conventional operation prior to this invention, this released gaseous fraction in conduit 33 was taken in by means of a compressor and then recompressed. During the recompression step, the gaseous fraction was heated up. Since the $H_2S$- and COS-containing fraction, however, must be desulfurized in the enrichment column 21 at low temperatures with cold methanol, the heating-up occurring during compression represents a cold value loss which must be compensated for again with external refrigeration in an exchanger. However, this raises the energy requirement for increasing the $CO_2$ yield. With the use of the process according to this invention, the compressor and recooler can be replaced by a liquid-jet compressor which also simultaneously takes over the task of a heretofore employed throttle valve for expanding the methanol introduced via conduit 18. In this throttle valve of prior processes, the entire energy which was liberated during expansion of the first scrubbing medium stream loaded with $H_2S$, COS and $CO_2$ was dissipated. This energy is now usefully exploited for the compression of produced expansion gases. Besides saving compression energy and external cold, this also makes it possible to replace an expensive part of the installation which frequently required servicing, i.e., the compressor.

From the bottom for the separator 32, 80 t/h of scrubbing methanol is withdrawn via conduit 34 and fed into a stripping column (not shown) for complete regeneration. The portion of the second scrubbing medium stream (20 t/h) that has not been recycled is withdrawn via conduit 41 and utilized for rescrubbing sulfur-containing components in the stripping column (not shown).

Figure 3:
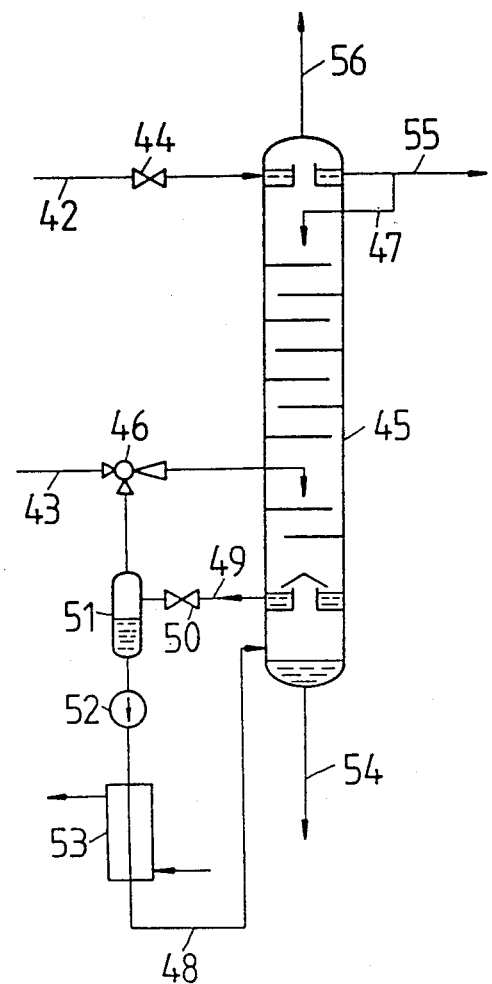
FIG. 3 shows the generation of peak cold in a cold scrubbing operation.

FIG. 3 likewise shows only a section of an entire installation for obtaining hydrogen and $CO_2$.

By way of a conduit 42, 55 t/h of methanol is conveyed from a scrubbing column (not shown). This methanol, representing a first scrubbing medium stream, is obtained under a pressure of 27 bar and at a temperature of $-50°$ C. It is almost saturated with $CO_2$. By way of conduit 43, 45 t/h of methanol loaded with $CO_2$ and $H_2S$ from the same scrubbing column is fed under a pressure of 27 bar and at a temperature of $-6°$ C. This methanol stream represents a second scrubbing medium stream.

The first scrubbing medium stream is expanded in a throttle valve 44 to 3.5 bar and introduced into the upper section, serving as a separator, of a $CO_2$ column 45. The second scrubbing medium stream is expanded to 3.5 bar in a liquid-jet compressor 46 and fed into the middle section of the $CO_2$ column. Concentration and recovery of $CO_2$ take place in the $CO_2$ column. For this purpose, the gas rising in the column is scrubbed with 35 t/h of $H_2S$-free scrubbing medium introduced via conduit 47. The gases rising in the $CO_2$ column 45 are composed of the gases formed by expansion in the liquid-jet compressor 46 and of the gases passing through conduit 48 into the lowermost section of the column 45. For producing these last-mentioned gases, liquid is withdrawn via conduit 49 from a flue plate arranged in the lower section of column 45, expanded in a throttle valve 50 to 1.0 bar and conveyed, after separation of the thus-liberated expansion gases in separator 51, through a heat exchanger 53 by means of a pump 52. In heat exchanger 53 the liquid stream is heated from −63° C. to −35° C. From heat exchanger 53 the heated stream is reintroduced into the column via conduit 48. In heat exchanger 53, the liquid is heated, for example, against a methanol stream (the methanol stream being completely regenerated in a subsequent stripping column, not shown), so that a portion of the components dissolved in the liquid is released, and a gas-liquid mixture passes, via conduit 48, into the column 45.

By expansion in valve 50, a portion of the concomitantly dissolved gases is liberated in gaseous phase with simultaneous cooling of the scrubbing medium. These expansion gases, separated in separator 51, are taken in by the liquid-jet compressor 46 and compressed to the pressure of column 45. By use of the liquid-jet compressor, cold can be obtained at the lowest temperature level for the scrubbing operation without additional energy, and thus the entire scrubbing process can be made more economical. The cold, obtained at a low temperature level, has the effect that the regenerated scrubbing medium can be subcooled to a greater extent, and accordingly the amount of scrubbing medium or the number of plates in the scrubbing column can be reduced.

The methanol introduced into the column 45 via conduit 42 can be fed at the very top into the head of the column, since the gas released during expansion in 44 is pure $CO_2$ which need no longer be scrubbed. In the head of the $CO_2$ column 45, the temperature is −45° C. The gas being withdrawn through conduit 56 (25,405 $Nm^3$/h) has the following composition:

| | |
|---|---|
| $H_2$ | 1.34 mol-% |
| $N_2$ + Ar + $CH_4$ | 0.14 mol-% |
| CO | 0.12 mol-% |
| $CO_2$ | 98.04 mol-% |
| $H_2S$ | 2 ppm |

The cold inherent in the gas is normally furthermore transferred to the crude gas by heat exchange (not illustrated) so that the $CO_2$ product is then available at a temperature of 27° C. and under a pressure of 2 bar.

From the bottoms of the column, via conduit 54, 80 t/h of methanol containing 1,841 $Nm^3$/h of $H_2S$ and 7,232 $Nm^3$/h of $CO_2$ is discharged and fed to a stripping column (not shown) for complete regeneration. Via conduit 55, 20 t/h of methanol is introduced to the stripping column for rescrubbing $H_2S$.

The ejectors that can be used in the preceding embodiments are generally described in "Ullmanns Encyclopadie de technischen Chemie", 4th edition, Vol. 3, p. 107–110 and p. 172.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for regenerating a scrubbing medium which has been utilized in a scrubbing operation, said scrubbing operation comprising contacting a gaseous mixture with a scrubbing medium to obtain a scrubbed gas fraction and said scrubbing medium loaded with scrubbed-out components from said gaseous mixture, and said process for regenerating comprising expanding the loaded scrubbing medium to release scrubbed-out components therefrom, the improvement comprising:
   expanding said loaded scrubbing medium in a first stage and at least one downstream expansion stage to obtain resultant regenerated scrubbing medium, wherein said loaded scrubbing medium is expanded in said first stage through a liquid-jet compressor to form resultant expanded loaded scrubbing medium and first stage expansion gases, and
   further expanding the resultant expanded loaded scrubbing medium in one of said at least one downstream expansion stage to form further expanded scrubbing medium and downstream expansion gases, separating said downstream expansion gases from said further expanded scrubbing medium, and passing said downstream expansion gases into said liquid-jet compressor.

2. A process according to claim 1, wherein said loaded scrubbing medium is expanded stepwise in a series of expansion stages by means of series-connected liquid-jet compressors.

3. A process according to claim 1, wherein said scrubbing operation comprises a process for scrubbing acid gas from said gaseous mixture.

4. A process according to claim 1, wherein said scrubbing operation comprises a water scrubbing process for the removal of $CO_2$ from said gaseous mixture.

5. A process according to claim 1, wherein said scrubbing operation operates at a substantially higher pressure than the pressure of the expanded loaded scrubbing medium.

6. A process according to claim 1, wherein said loaded scrubbing medium is expanded in a preliminary expansion stage upstream of said first stage to form a liberated gaseous phase, said liberated gaseous phase being returned to said scrubbing operation, and scrubbing medium discharged from said preliminary stage is introduced into said liquid-jet compressor of said first stage for further expansion.

7. A process according to claim 6, wherein said preliminary expansion stage comprises a gas turbine.

8. A process according to claim 6, wherein said resultant expanded scrubbing medium and first stage expansion gases are discharged from said first stage and introduced into a separator, and resultant expanded scrubbing medium is removed from said separator and delivered to said at least one downstream expansion stage.

9. A process according to claim 8, wherein said regenerated scrubbing medium is returned to said pressure scrubbing operation.

10. A process according to claim 1, wherein, after said loaded scrubbing medium is expanded in said first stage, resultant expanded scrubbing medium is delivered to a separator wherein a gaseous phase and a partially expanded scrubbing medium phase are separated, said partially expanded scrubbing medium phase is further expanded in a subsequent expansion stage and delivered to a second separator wherein expansion gases are separated from regenerated scribbing medium, said expansion gases being delivered to said first stage and pressurized by said liquid-jet compressor.

11. A process according to claim 10, wherein said regenerated scrubbing medium is returned to said scrubbing operation.

12. A process according to claim 1, wherein said scrubbing operation employs a physical scrubbing medium.

13. A process according to claim 12, wherein said gaseous mixture contains $CO_2$ and $H_2S$ and said scrubbing operation comprises removing $CO_2$ and $H_2S$ from said gaseous mixture by scrubbing with said physical scrubbing medium.

14. A process according to claim 13, wherein said physical scrubbing medium comprises methanol.

15. A process according to claim 13, wherein, after expansion of the loaded physical scrubbing medium stream within said liquid-jet compressor of said first stage, resultant expanded physical medium stream and liberated gases are delivered to an enrichment column having a top portion, a middle portion and a bottom portion, said resultant expanded physical medium stream and liberated gases being introduced into said middle portion, a $CO_2$ product stream being discharged from said top portion, and a physical medium stream enriched in $H_2S$ and COS being discharged from said bottom portion.

16. A process according to claim 15, wherein said liberated gases rise upwardly within said enrichment column in countercurrent contact with a second scrubbing stream delivered to the top portion of said enrichment column.

17. A process according to claim 15, wherein the enriched physical medium stream is removed from said bottom portion of said enrichment column and delivered to a stripping column for further regeneration.

18. A process according to claim 15, wherein said resultant expanded physical medium stream is removed from said column and further expanded in said downstream expansion stage to form said downstream expansion gases and further expanded physical medium stream, and said downstream expansion gases are delivered to said liquid-jet compressor of said first stage and pressurized.

19. A process according to claim 18 wherein said further expanded physical medium stream is delivered to said bottom portion of said column.

* * * * *